US012125161B2

(12) United States Patent
Ye et al.

(10) Patent No.: US 12,125,161 B2
(45) Date of Patent: Oct. 22, 2024

(54) MODIFYING SHAPE BASED ON LEVEL SET REPRESENTATION TO REDUCE SUPPORT IN ADDITIVE MANUFACTURING

(71) Applicant: Palo Alto Research Center Incorporated, Palo Alto, CA (US)

(72) Inventors: Qian Ye, Sunnyvale, CA (US); Matt Patterson, Palo Alto, CA (US); Amirmassoud Mirzendehdel, Millbrae, CA (US); Morad Behandish, San Mateo, CA (US)

(73) Assignee: Xerox Corporation, Norwalk, CT (US)

( * ) Notice: Subject to any disclaimer, the term of this patent is extended or adjusted under 35 U.S.C. 154(b) by 99 days.

(21) Appl. No.: 17/715,631

(22) Filed: Apr. 7, 2022

(65) Prior Publication Data

US 2023/0326155 A1    Oct. 12, 2023

(51) Int. Cl.
*G06T 15/00*    (2011.01)
*B29C 64/386*   (2017.01)
(Continued)

(52) U.S. Cl.
CPC ............ *G06T 19/20* (2013.01); *B29C 64/386* (2017.08); *B33Y 50/00* (2014.12); *G06T 2219/2021* (2013.01)

(58) Field of Classification Search
CPC ....... G06T 17/10; G06T 11/203; B29C 64/40; B29C 64/386; B33Y 30/00; B33Y 50/02; B33Y 10/00
See application file for complete search history.

(56) References Cited

U.S. PATENT DOCUMENTS 10,434,717 B2 * 10/2019 Boettcher ............. B29C 64/386
11,084,223 B2 *  8/2021 Lewicki ................ B29C 64/393
(Continued)

FOREIGN PATENT DOCUMENTS

EP    3798895 A1    3/2021

OTHER PUBLICATIONS

Allaire G, Dapogny C, Estevez R, Faure A, Michailidis G. Structural optimization under overhang constraints imposed by additive manufacturing technologies. Journal of Computational Physics. Dec. 15, 2017;351:295-328.*
(Continued)

*Primary Examiner* — Phu K Nguyen
(74) *Attorney, Agent, or Firm* — Womble Bond Dickinson (US) LLP

(57) ABSTRACT

The present disclosure provides techniques for automatically modifying shape features related to overhangs such that support structures can be reduced or avoided. In an example, a shape modification processing device may obtain an initial shape and relevant production information (e.g., overhang angle threshold). The shape modification processing device may modify the shape to improve various aspects of production, including reduction or removal of the need for support materials or structures during additive manufacturing, with considerations that allow the modified portion (e.g., added features) be accessible for removal by subtractive manufacturing. For example, the shape modification processing device may modify a model to reduce or remove support structures needed during production. The added features may later be removed by subtractive manufacturing to restore any functional or desired shape.

20 Claims, 19 Drawing Sheets

(51) Int. Cl.
*B33Y 50/00* (2015.01)
*G06T 19/20* (2011.01)

(56) References Cited

U.S. PATENT DOCUMENTS

| | | | | |
|---|---|---|---|---|
| 11,501,032 | B2* | 11/2022 | Zhou | ................. G06F 3/00 |
| 11,507,054 | B2* | 11/2022 | Behandish | ............. G06F 30/23 |
| 2020/0150623 | A1 | 5/2020 | Bandara et al. | |
| 2022/0004682 | A1* | 1/2022 | Bandara | ............... B29C 64/393 |
| 2022/0156430 | A1* | 5/2022 | Lambourne | ............ G06F 30/17 |

OTHER PUBLICATIONS

Cacace S, Cristiani E, Rocchi L. A level set based method for fixing overhangs in 3D printing. Applied Mathematical Modelling. Apr. 1, 2017;44:446-55.*

Extended EP Search Report dated Jun. 27, 2023 in corresponding EP application No. 23162847.0-1224 (11 pages).

* cited by examiner

MODIFYING SHAPE BASED ON LEVEL SET REPRESENTATION TO REDUCE SUPPORT IN ADDITIVE MANUFACTURING

TECHNICAL FIELD

Implementations of the present disclosure relate to additive manufacturing.

BACKGROUND

Additive manufacturing (often known as 3D printing, or referred to as printing) enables the production of structures that are complicated in shape and not achievable by subtractive manufacturing methods. For example, hollow structures that are expensive or difficult to achieve in machining processes (i.e., removal of materials by turning, drilling, and milling) may be created layer by layer in additive manufacturing. Many forms of additive manufacturing make use of transforming matters from one state to another, such as from liquid to solid, by chemical reactions, or by heat (e.g., melting materials at specific locations and solidifying when cooled).

Some additive manufacturing techniques, such as material jetting or fused deposition modeling (FDM), require support structures to provide a substrate for overhangs (e.g., protrusions of the target shape, when sliced in the production direction, being lack of materials in the previous layer). For example, in material jetting, a layer of photo-sensitive polymer is jetted (similar to ink-jet printing) on a flat surface formed by the previous layer and cured into solid by ultra-violet (UV) light. The flat surface may include the model to be formed as well as support materials necessary to support the polymer in the current layer. The support materials can be removed upon completion, such as by melting or dissolving. In FDM, a molten string of filament is extruded and deposited by a hot-end nozzle into a sliced pattern in each layer, the molten string solidifies after exiting the hot-end nozzle. The same molten string is used to form the support structures for subsequent layers. Upon completion, the support structures are manually removed.

The support materials, if different from the material, can be expensive in material cost and can increase management complexity. Even when the support structure is of the same material as the printing material, removal can be time-consuming and may cause damage to the target model. Therefore, in either situation, for objects of a certain overall size and shape, the less support structure needed during printing, the lower the cost in materials and time is needed, and the better finish of the printed shape can be achieved.

Although changing the orientation of the target shape in reference to the production direction may reduce the support structures needed, changing the orientation alone may also introduce new overhangs and cannot locally address shape features that would result in the overhang in any orientations (e.g., a flower with radiating petals).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

Like numerals indicate like elements.

DETAILED DESCRIPTION

Figure 1:
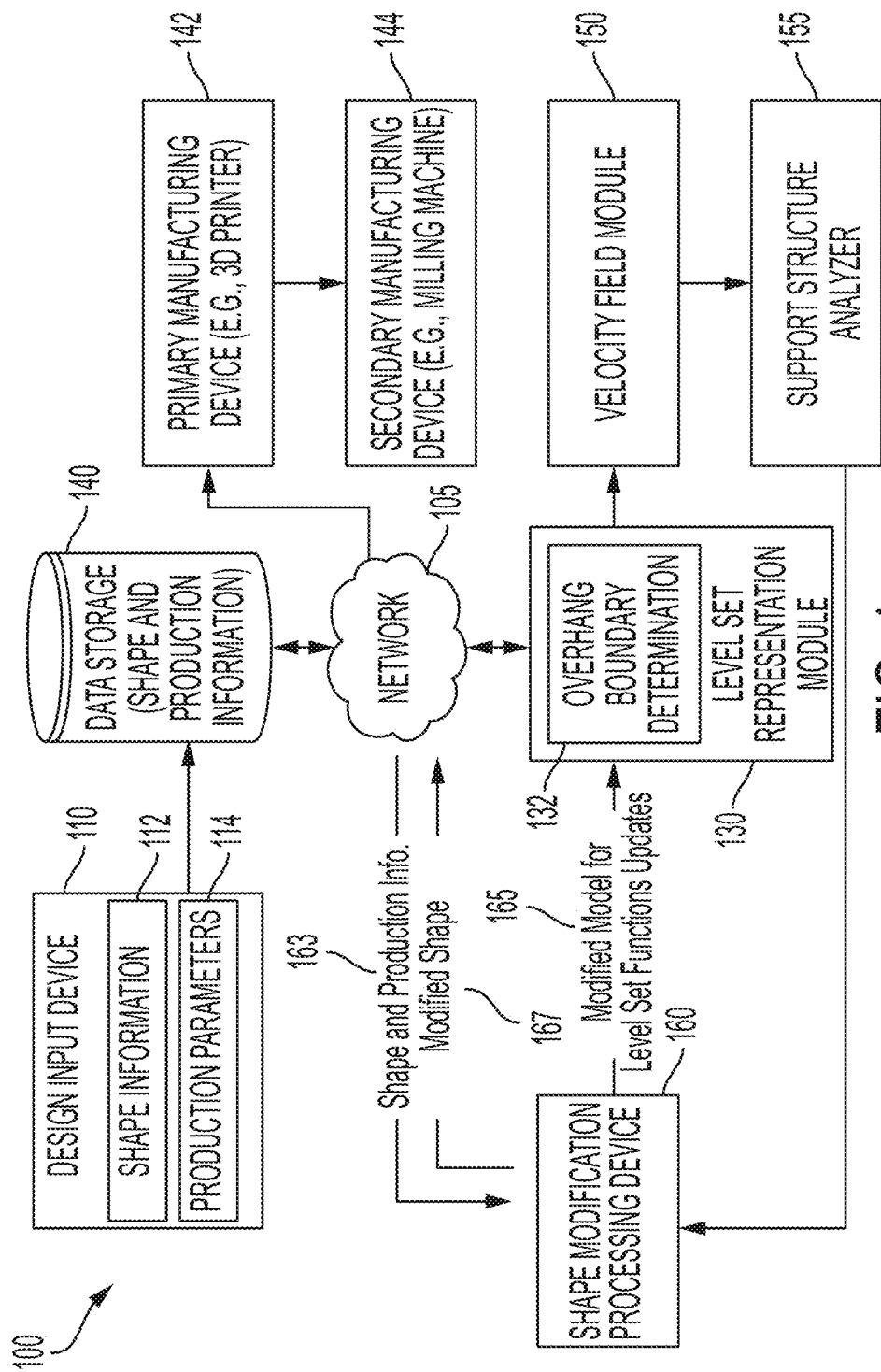
FIG. 1 illustrates a block diagram of a shape modification system for modifying shape based on level set representation to reduce support in additive manufacturing, in accordance with certain aspects of the present disclosure.

The present disclosure provides various techniques for modifying shape based on level set representation to reduce support in additive manufacturing (AM). As complicated shapes often include overhangs, which are suspended features that require to add support structures to counteract forces related to production, such as gravity or tension relative to a build platform (e.g., a production environment). However, this process is necessary but pricy. Before sending the job to the printer, People will need extra computational steps to add the supporting structures and spend more time slicing the whole design. After printing, the support material needs to be removed, which costs additional time, energy, and material.

The present disclosure provides techniques, apparatus, systems, processes, methods, and/or non-transitory computer-readable storage medium for automatically modifying shape features related to overhangs such that support structures can be reduced or avoided. For example, given an original shape to be manufactured, the present disclosure provides techniques for automatically morphing (e.g., changing by iterations, such as topology optimization) the local overhangs into new shapes that require less support structures (or no support structure at all). The disclosed techniques balance between shape fidelity (e.g., how much shape alternation is introduced) with support related cost reduction. The terms "modifying," "changing," "morphing," "updating," "tailoring," "optimizing," or "altering," among others, herein may interchangeably be used to indicate any alteration, including adding, increasing, subtracting, reducing, extending, rotating, scaling, moving, or otherwise causing change to one or more point coordinates of the original shape or subsequently changed shapes.

In an example, a shape modification processing device may obtain an initial shape and relevant production information (e.g., overhang angle threshold). The shape modification processing device may modify the shape to improve various aspects of production, including reduction or removal of the need for support materials or structures during AM, with considerations that allow the modified portion (e.g., added features) to be accessible for removal by subtractive manufacturing (SM). For example, the shape modification processing device may modify a model to reduce or remove support structures needed during production. The added features may later be removed by SM to restore any functional or desired shape (e.g., to restore a modified hole for assembly purposes, or for finalizing a desired shape such as in wired arc additive manufacturing (WAAM)).

According to aspects of the present disclosure, methods for modifying a shape of a digital model in AM are provided. An example method may include receiving the digital model and one or more production parameters (e.g., build direction or model orientation relative to the manufacturing settings). A processing device may identify a portion of the digital model to be modified based on an initial production cost associated with support structures needed for the digital model based on one or more production parameters. Identifying the portion of the digital model includes generating a level set representation of the digital model. The processing device may modify the identified portion of the digital model to reduce support structures needed based on the one or more production parameters.

In an example, the processing device analyzes a received model to be used in additive manufacturing before sending the model for production. The processing device examines and identifies portions of the model that require support structures. The processing device then computes to update the shape of the model, aiming to preserve as much original shape as possible while making changes to minimize the support structures needed for the modified shape. The processing device may verify that the modified shape indeed has a lower production cost (e.g., savings from the reduction in the support structure, machine time, and other considerations).

In aspects of the present disclosure, identifying the portion of the digital model (e.g., a local shape feature) may include generating the implicit representation of the digital model using a level set method (LSM). In general, LSM includes a computational framework that uses isosurface for the numerical analysis of surfaces and shapes. A level set of a real-valued function (e.g., a shape) includes a set where the function takes on a constant value. LSM allows for surface computations on a fixed Cartesian grid without parametrization.

According to aspects of the present disclosure, the processing device may use LSM to detect, determine, or ascertain overhang boundaries that require support structures. The overhang boundaries may indicate the local shape features to be modified. In some cases, the level set representation includes using LSM and related computational processing to determine an exact portion of the overhang boundaries that may be modified, as further discussed below.

FIG. 1 illustrates a block diagram of a shape modification system 100 for modifying shape based on level set representation to reduce support in additive manufacturing, in accordance with certain aspects of the present disclosure. As shown, the shape modification system 100 includes a shape modification processing device 160, which may receive shape and production information 163 from the data storage 140 via the network 105. The shape modification processing device 160 may analyze and update the shape based on the production information and return a modified shape 167 to the data storage 140, as well as sending, via the network 105, the modified shape 167 to be manufactured, such as in the primary manufacturing device 142 as well as the secondary manufacturing device 144.

The shape and production information in the data storage 140 may be received from a design input device 110. The design input device 110 may include any computational terminal, such as a standalone computational device that includes individual processing and storage capacities. The design input device 110 may receive various inputs from a user, such as model designs or shape information 112, and the selection or configuration of production parameters 114.

The shape information 112 may include computer-aided design (CAD) models (e.g., in AutoCAD™, Solidworks™, STEP, VRML, IGES, or DXF formats), standard triangle language (STL) models or similar point cloud models (e.g., .obj, .x3d, files and the like), or files that can be converted to such files (e.g., .png image files with user-defined thickness information). The shape information 112 may generally be referred to as a digital model, a model, a design, or an object.

The production parameters 114 may include settings of various aspects of the shape information 112 in relation to a production environment. For example, the production parameters 114 may include relative position information that describes where the object to be produced is relative to a production space of the production environment. The production parameters 114 may further include orientation information of the object relative to tool movements (directions of which may be referred to as production, manufacturing, or build directions). In some cases, such as in AM, the orientation of the object is relative to a build direction that next layers or additional materials are to be added. The production parameters 114 may further include various types of parameters depending on materials and the corresponding manufacturing techniques, as briefly discussed below.

In AM in general, layers of materials may be added along the build direction (e.g., starting from a build platform). Any material that may solidify into a controlled pattern may form each of the added layers, such as, for example, powder materials to be sintered at high temperatures, extrudable materials to be extruded and solidify, and photosensitive materials to be solidified from liquid by light.

Specifically, powder materials may include any pulverized materials, such as metal powders and powders of various thermoplastics. When locally heated, by a high power laser dot, for example, the powder materials melt and connect into a solitary piece. By controlling the production parameters 114, including power output, how fast the laser dot (or another heat source) is traveling, how big (or small) the laser dot is used, the size and density of the powder materials, the melting temperature, and other production parameters, a physical copy of the model can be produced. Selective laser sintering (SLS), selective laser melting (SLM), and laser powder bed fusion (LPBF) are examples of manufacturing techniques that use powder materials.

Extrudable materials may include various thermoplastic materials as well as edible materials such as sugar or ice cream, or materials such as sand or glass. Example thermal plastic materials may include acrylonitrile butadiene styrene (ABS), polylactic acid (PLA), polyethylene terephthalate glycol (PTEG), nylon, thermoplastic polyurethane (TPU), polycarbonate (PC), and any combination thereof. Fused deposition modeling (FDM) is an example AM technique applicable to use extrudable materials in AM processes. Extrudable materials may also include materials that solidify by chemical reactions, such as concrete, two-part epoxy, or the like.

During printing of the extrudable materials, a controlled portion of the extrudable materials is extruded and deposited onto a layer below (or the build plate when printing the first layer). The deposited portion is quickly cooled down to solidify, either by conducting the heat away through the layer below or transferring away by cool air created to surround the extrusion. Or, in case of curing or solidifying by chemical reactions, the extruded materials may solidify in an expected reaction time. By controlling the production parameters 114, such as the extrusion temperature, the cooling rate (or the solidifying rate), the extrusion rate, and other constraints (e.g., the width of the extrusion nozzle), parts of different materials and different strengths can be printed.

Figure 3A:
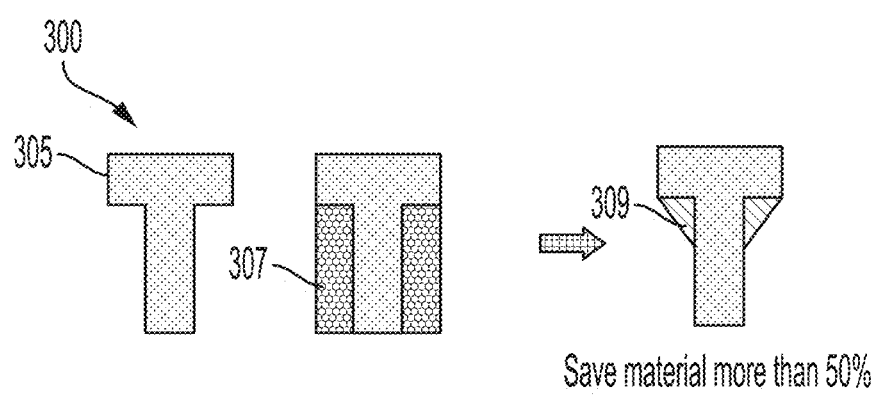
FIGS. 3A and 3B illustrate examples of support structures generation and shape modification, in accordance with certain aspects of the present disclosure.
Figure 3B:
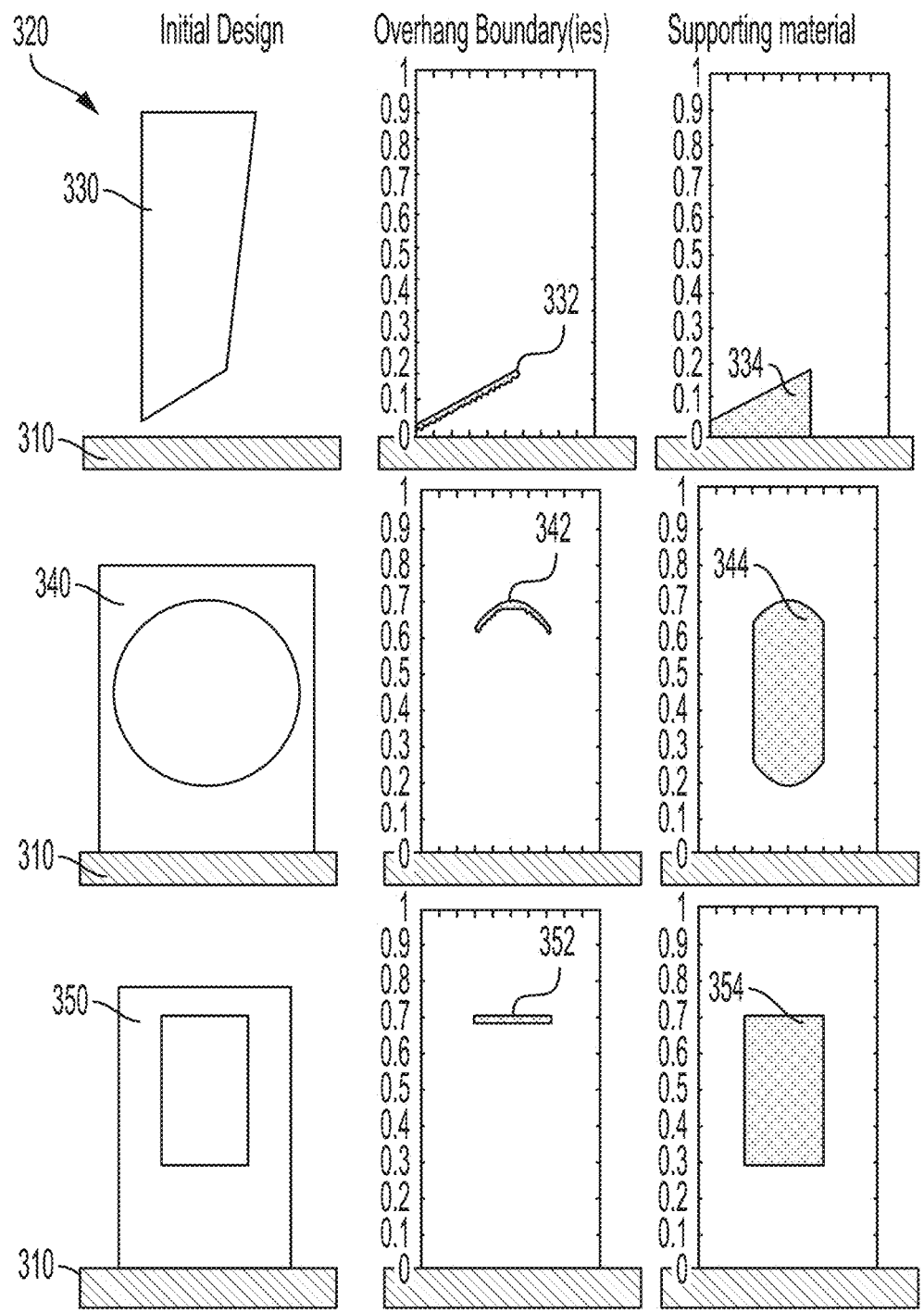

During extrusion, the materials require a foundation to rest on (either before or after solidifying). The foundation may be the build platform or the previous printed layer. For certain shapes (e.g., overhangs), the current layer may extend beyond the previous layer and requires additional support. A structure (referred to as "support structure(s)" herein, examples illustrated in FIGS. 3A and 3B and discussed below) of the same extrudable material or a different extrudable material may be formed to provide the needed support, which may require physical (e.g., break-away or melt-off) or chemical removal (e.g., to be dissolved). Examples of support structures are shown in FIGS. 3A and 3B.

Photosensitive materials may include curable resin materials reactive to ultra-violet radiations at various wavelength ranges (e.g., 390-405 nm). During printing, each layer of photosensitive materials is exposed, either globally or locally, to a curing light source to transform from liquid to solid. In some examples, such as stereolithography (SLA) 3D printing or liquid crystal display (LCD) 3D printing, a tank or bath of the photosensitive materials may be disposed between a light source and a build platform. The light source may be a moving laser dot (e.g., in SLA) or a collimated beam filtered by an LCD. The initial layer may be created by having the build platform positioned adjacent to a transparent and flexible medium to produce a thin layer of the photosensitive materials in the liquid phase. The movement of the laser dot and the filtering pattern of the LCD creates the pattern for each layer.

Upon the initial layer solidifies, the build platform and the cured layer are moved away from the medium to allow the next layer of photosensitive materials in liquid phase to enter the gap between the platform and the medium. Layer by layer, the build platform moves away from the medium (and the light source) to form the model. In some examples, such as in "Polyjet" 3D printing, the photosensitive materials may be disposed directly by jetting (similar to jetting ink by inkjet printers) onto the previous layer or a build surface and then cured by a light source.

In some examples, a print head may extrude thick or viscous photosensitive materials that are cured by a light source carried by the print head. When the aforementioned techniques are used, the production parameters 114 may include various aspects of exposure (e.g., light power, rate of transmission, exposure time, etc.), pattern creation (e.g., laser dot size, LCD resolution, jetting resolution, etc.), and other system parameters (e.g., layer height, material properties, etc.).

Similar to the production process of the extrudable materials, photosensitive materials may also require support structures during production. For example, in cases where the photosensitive materials are jetted to form each layer, before the jetted fluids are solidified, the fluids require uniform support underneath to avoid flowing into a wrong pattern. Support materials (e.g., materials of a relatively low melting point, such as wax, when the photosensitive material includes a polymer) may be jetted alongside the photosensitive materials on each layer to form the support (and solidifies by cooling as opposed to reacting to light). This way, significant details may be achieved at the cost of expenses in the support materials, which may be more expensive than the photosensitive materials used in forming the model. Even for SLA or LCD types of printing techniques, support structures (often in the form of sprues connecting overhangs to the build platform) are required and may significantly increase the cost and time of production.

In some cases, the production parameters 114 may also include parameters for SM. For example, the model carried in the shape information 112 may be produced using AM, SM, or a combination thereof. SM may include computer-numerically controlled (CNC) machining processes, such as milling, turning, among others.

The design input device 110 may provide the shape information 112 and the production parameters 114 to the data storage 140, which contains at least a set of the shape and production information that may be provided to the network 105. The network 105 may, upon demand or request by a user, provide the shape and parameter information to a primary manufacturing device 142. In some cases, a secondary manufacturing device 144 connected with the primary manufacturing device may also receive at least a portion of the shape information and production information, to complement certain manufacturing steps not performed by the primary manufacturing device 142.

The shape modification processing device 160 may obtain the shape and production information 163 from the data storage 140 and modify the shape 167 based on the information 163 to improve various aspects of production, including reduction or removal of the need for support materials or structures during AM, with considerations that allow the modified portion (e.g., added features) be accessible for removal by SM. For example, in general, the shape modification processing device 160 may modify a model to reduce or completely remove support structures needed during production. As aforementioned, support structures often incur additional costs and manufacturing time in AM processes. By reducing or removing the requirement for support structures, the overall AM production process becomes more efficient (e.g., in terms of materials, costs, and time). The added features may later be removed by SM to restore any functional or desired shape. The shape modification performed by the shape modification processing device 160 is illustrated in FIG. 3A.

In FIG. 3A, a shape modification process 300 of an example workpiece 305 is shown in the front view. In this example, the build direction is from bottom to top and the orientation of the workpiece 305 is fixed (e.g., for reasons such as surface quality, strength, among other considerations). Before any shape modification, support structures 307 are required for successful production of the overhangs (the arms of the "T") in various production techniques mentioned above. The shape modification processing device 160 modifies the workpiece 305 by adding local features 309, which allows the workpiece 305 to be printed without using any support. In some cases, the added features 309 are computed to allow for removal by SM techniques.

Returning to FIG. 1, the shape modification processing device 160 may form an iterative computation loop with other processing modules, including the level set representation module 130, the velocity field module 150, and the support structure analyzer 155. The level set representation module 130 may perform shape modification using the level set representation component 132. For example, the level set representation module 130 may identify or generate a smooth surface defined on a higher dimension of an input design (e.g., a cross-section thereof) for determining a boundary of an overhang that requires support structures.

Based on level set representation, the velocity field module 150 may construct a velocity field that applies a smooth global function to direct the boundaries to move along the normal direction. Based on the updated level-set function, the velocity field module 150 may provide information to the shape modification processing device on which local shape features need be modified.

The support structure analyzer 155 may compute overhang angles and identify boundaries that need support structures. The support structure analyzer 155 therefore may provide information (e.g., a simulated result) to the shape modification processing device 160 for determining whether a shape modification reduces the support structures and/or the costs associated therewith. The shape modification processing device 160 may accordingly perform shape modification and provide a modified model 165 for level set function updates to the level set representation module 130. The shape processing device 160 may perform one or more iterations to reduce or remove the support structures. Details operations of the shape modification processing device 160, the level set representation module 130, the velocity field 150, and the support structure 155 are further discussed in view of FIGS. 2-7.

Although the design input device 110 and the shape modification processing device 160 are illustrated as two separate devices, in some cases, the design input device 110 and the shape modification processing device 160 may be included in a same computational system (or two modules on a common computational platform). In some cases, the design input device 110 may have sufficient computational power to behave as the shape modification processing device 160, or the shape modification processing device 160 may include one or more user interfaces to receive direct input of modeling and production parameters therein.

In some cases, the design input device 110 may be a consumer terminal (e.g., a personal computer, a smart phone, etc.) that enables a user to upload designs and relevant information to the data storage 140. The shape modification processing device 160 may behave as a server performing requested services to modify or improve the shape and production information in the data storage 140, via the network 105. The data storage 140 may store production information separate from the design input device 110 (e.g., from the primary manufacturing device 142). The systems, techniques, and methods disclosed herein may therefore be applicable without a fixed terminal for the design input device 110, and rather, a flexible web-based service that connects user data, processing devices, and manufacturing devices in one production optimization environment.

Figure 2:
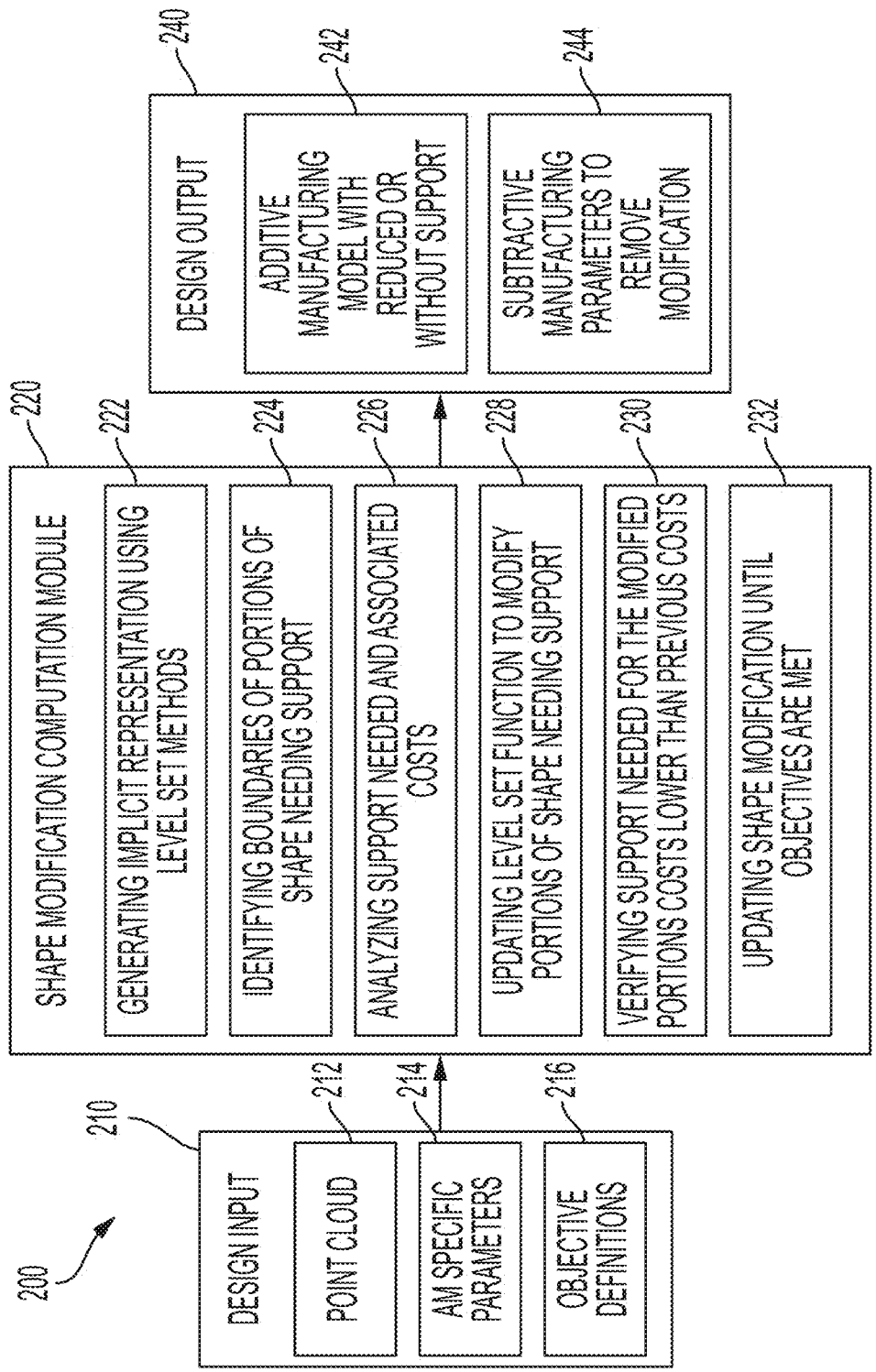
FIG. 2 illustrates a block diagram of data flow in modifying shapes or designs based on level set representations, in accordance with certain aspects of the present disclosure.

FIG. 2 illustrates a block diagram 200 of computing or generating new shapes or designs based on iterative considerations of shape modifications that reduce support structure requirements. As shown, design input 210 is provided to shape modification computation module 220, which generates the design output 240. The design input 210 may include a set of point cloud 212 indicating a shape of a model, one or more AM specific parameters 214 (e.g., the production parameters 114 described above), and one or more objective definitions 216. The objective definitions 216 may include production cost, target cost reduction, production time limits, production schedule, strength, and other goal related criteria.

Figure 5A:
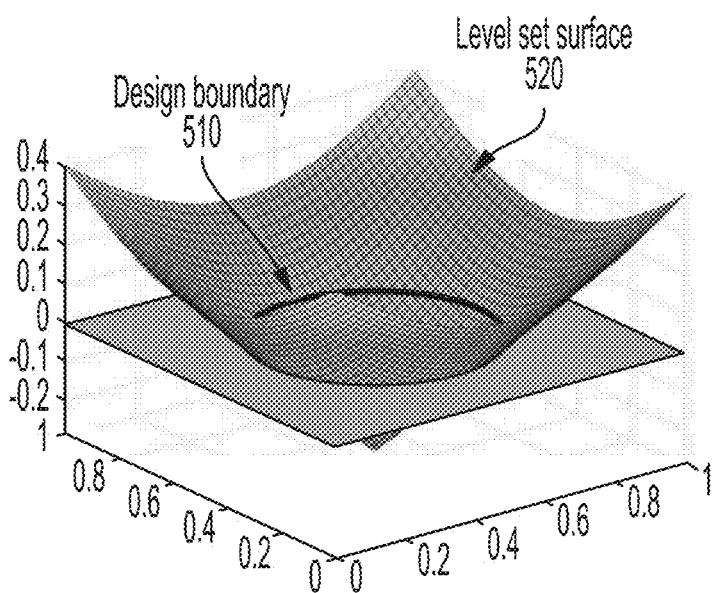
FIGS. 5A and 5B illustrate examples of a level set representation and the associated velocity field before shape modification, in accordance with certain aspects of the present disclosure.

Upon receiving the design input 210, the shape modification computation module 220 may, at 222, generate an implicit representation of the original shape represented by the point cloud 212 using LSM. An example of an implicit representation is shown in FIG. 5A, in which the level set surface is illustrated. The level set representation of FIG. 5A corresponds to the shape 340 shown in FIG. 3B.

At 224, boundaries of portions of the design or model and the corresponding implicit representation allow for identifying overhang boundaries based on information processed. An example 420 of determining the boundaries of a model is shown in FIG. 4B. A model of a complicated shape (e.g., two cone shapes intersecting each other) is used as an example. To identify a boundary where the plane intersects the two cones may be difficult if the horizontal plane moves upwards and resulting in two separated boundaries. The difficulty in describing the transformation numerically following such evolution (e.g., how the boundary changes as the plane moves) can be solved by using LSM. The LSM relies on the representation of a domain of values in implicit form via a scalar function satisfying properties 430, 432, and 434 as illustrated in FIG. 4B. The boundary of the example shape can thus be determined when the values of the shape coincide with the 0 isovalue of $\phi$, or $\phi(x,t)=0$, wherein $\phi$ is a sign distance function.

At 226, the shape modification computation module 220 may perform the analysis on the support structures required and the associated costs for producing the model, based on the boundaries identified at 224. For example, FIG. 3B illustrates examples 320 of support structures analyses on initial designs 330, 340, and 350, which are respectively to be built from a build platform 310 in a build direction perpendicular upward. As shown, respective overhang boundaries 332, 342, and 352 are determined based on the computations at 222 and 224. At 226, the analyses determine that support structures 334, 344, and 354 are required (illustrative purposes only). The support structures 334, 344, and 354 may vary depending on various production parameters 114 and the overhang angles defined, as shown in FIG. 4A.

Figure 4A:
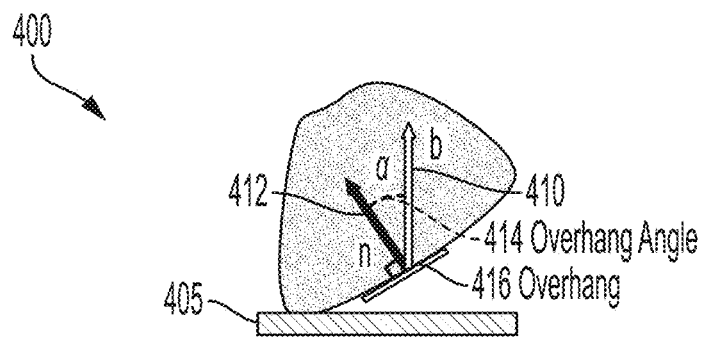
FIG. 4A illustrates an examples of overhang identification, in accordance with certain aspects of the present disclosure.
Figure 4B:
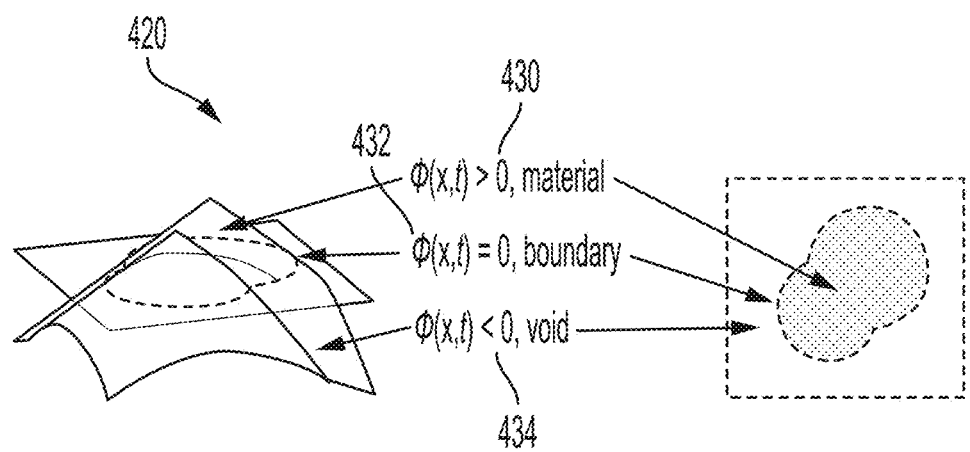
FIG. 4B illustrates an example of a level set representation, in accordance with certain aspects of the present disclosure.

Briefly turning to FIG. 4A, a local view 400 shows a shape having the overhang angle 414 determined based on the build direction 410 relative to the build platform 405, and a normal direction 412 relative to a tangential plane of a point of the overhang 416. The overhang angle 414 is the angle between the build direction 410 ($b$) and the normal direction 412 ($n$), which may depend on the production parameter 114. For example, given an overhang angle threshold $\alpha_0$, the overhang boundary is identified by comparing the calculated $\alpha_0$ with $\alpha_0$. The overhang angle has the following relationship:

$$\cos \alpha = n \cdot b.$$

where $$n = \frac{\nabla \phi}{|\nabla \phi|},$$

and when $\alpha < \alpha_0$, the structure is regarded as overhang.

Returning to FIG. 2, at 228, the shape modification computation module 220 may update the level set function to modify portions of the shape that needs support structures. Examples for level set representations and the corresponding velocity fields are shown in FIGS. 5A, 5B, 6A, and 6B. To update the level set function by constructing a velocity field, an objective of minimizing an overhang area may be formulated as follows:

$$\text{Min: } J = |\partial \Omega|.$$

The above is subject to a face overhang constraint $$\eta = \frac{n \cdot b}{\|n\|} - \cos\alpha_0 \leq 0.$$

The corresponding velocity field may be constructed as:

$$v_n = f_{overhang} + \kappa, \text{ where } f_{overhang} = \frac{e^{|\eta|}}{1 + \gamma e^{2\beta|\eta|}}$$

is a smooth step function (or overhang removal function), which drives the shape design to move with respect to the face overhang constraint $\eta$;
where:
  $\Omega$ is the design area,
  $\lambda$ is the Lagrangian multiplier,
  $\alpha_0$ is an overhang angle threshold,
  b: a direction of production, building, or manufacturing (e.g., the build direction 410 of FIG. 4),
  n: is a normal direction on an overhang boundary,
  $\kappa$ is the smoothness control term that reduces zig-zags in the digital model, and is essentially the mean curvature, and
  $\gamma$ and $\beta$ are smoothing parameters for controlling the smoothness of the velocity field.

For the overhang removal function $f_{overhang}$, the value may be maximal when the overhang angle equals to a user defined overhang angle threshold $\alpha_0$, greater than zero when the overhang angle is less than the threshold $\alpha_0$, and equals to zero when the overhang angle is greater than the threshold $\alpha_0$. By minimizing the objective function, the total length of the boundary is reduced (and therefore, reducing the corresponding support structures needed). In addition, the minimization process may smooth out unwanted boundary patterns (e.g., by adjusting the smoothing parameters $\gamma$ and $\beta$).

Figure 5B:
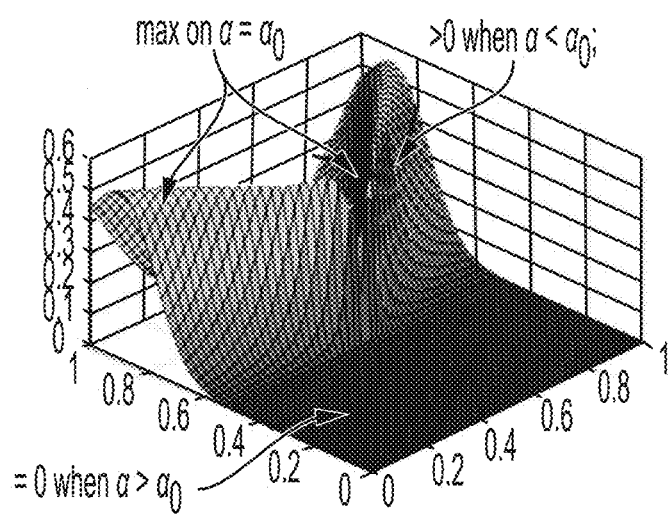

Briefly turning to FIGS. 5A and 5B, FIG. 5A shows a level set surface 520 corresponding to the example initial design 340 shown in FIG. 3B. A corresponding velocity field 550 is constructed based on the boundary 510 identified using LSM. In the velocity field 550, maximal values are identified to correspond to the boundary 510.

Figure 6A:
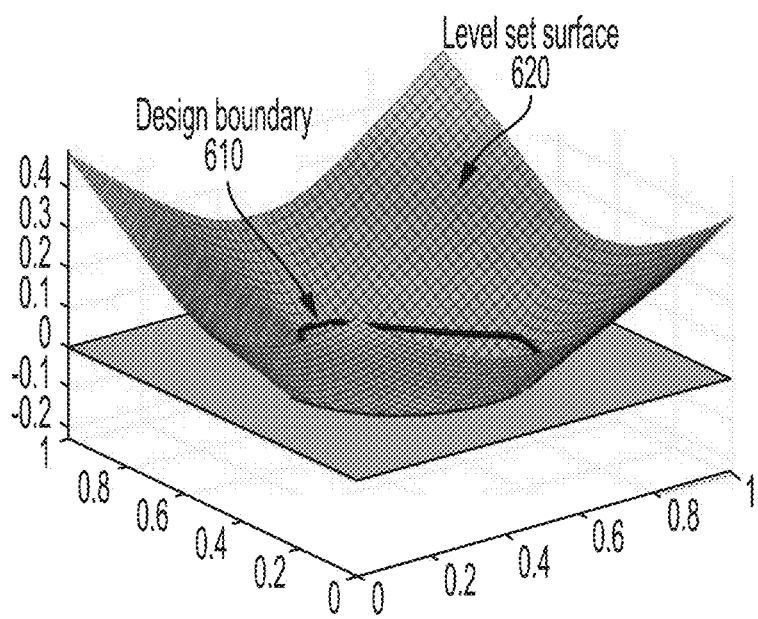
FIGS. 6A and 6B illustrate examples of a level set representation and the associated velocity field before shape modification, in accordance with certain aspects of the present disclosure.
Figure 6B:
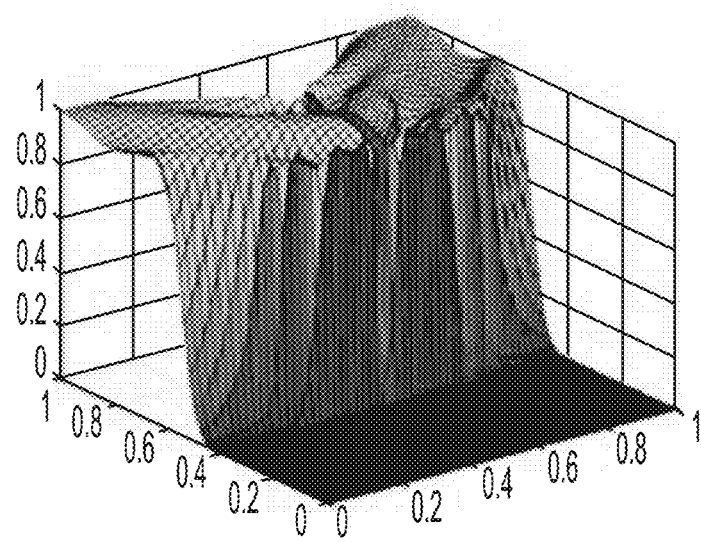

Briefly turning to FIGS. 6A and 6B, FIG. 6A shows a modified boundary 610 of a modified shape based on the initial design 340. The modified boundary 610 is shown in the updated level set surface 620. FIG. 6B shows a corresponding velocity field constructed for modifying or updating the boundary of the initial design 340, to remove the requirements for support materials. As such, the updated design (examples in FIG. 8) achieves removing, or at least reducing the need for support structures.

Returning to FIG. 2, at 230, the shape modification computation module 220 may verify that the support structures needed for the modified portions (e.g., by running through the previous processes at 222, 224, and 226 on the modified shape) cost lower than the support structures needed for the previous (or initial) shape. The verification may confirm that the performance of updating the level set function is converging toward an optimum.

Upon verification, at 232, the shape modification computation module 220 may continue to modify the shape in additional iterations until objectives (e.g., as defined in the objective definitions 216) are met. At this point, the updated shape may be output to the design output 240.

The design output 240 may include an additive manufacturing model of the modified shape 242. The modified model requires reduced or moved support structures compared to the initial model of the design input 210. The design output 240 may also include one or more subtractive manufacturing parameters 244 to be used for removing the shape modification, thus preserving the original desired geometry of the design input 210. For example, the subtractive manufacturing parameters 244 may be determined at 228 using information determined based on the inaccessible measure field (IMF).

Figure 7:
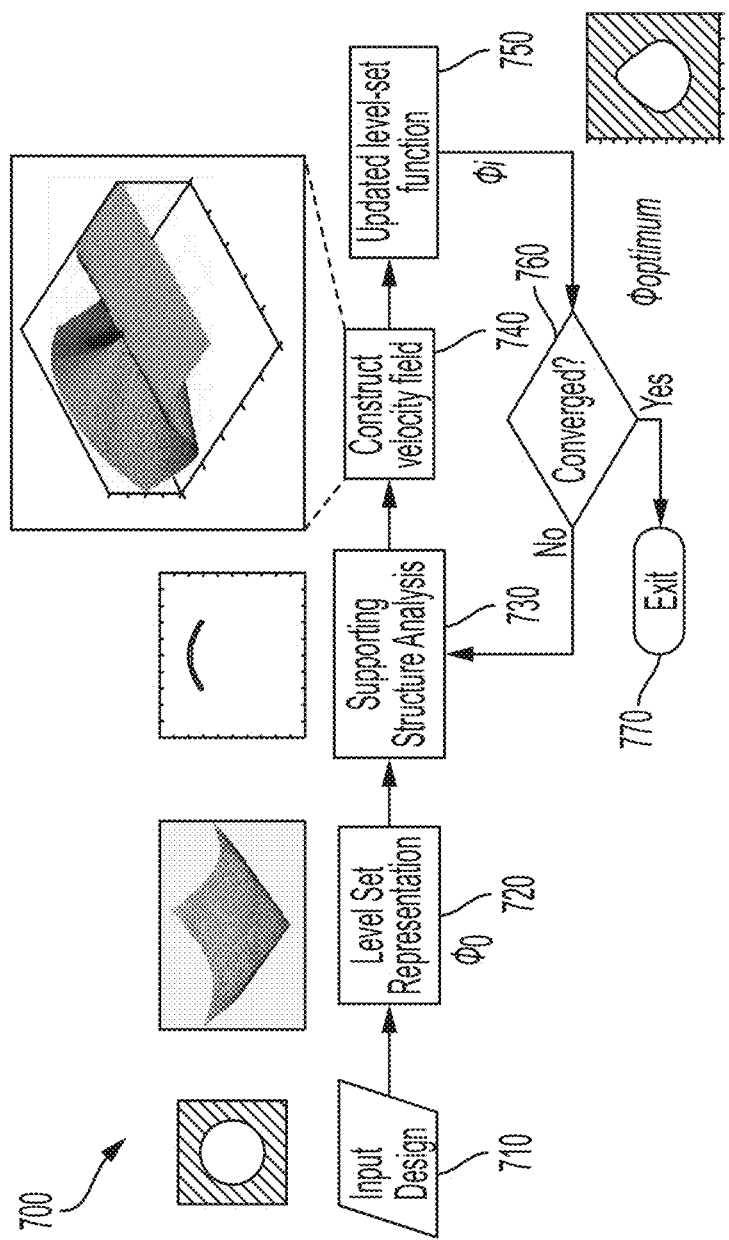
FIG. 7 illustrates an example shape modification process based on level set representation, in accordance with certain aspects of the present disclosure.

FIG. 7 illustrates an example shape modification process 700 based on level set representation, in accordance with certain aspects of the present disclosure. The process 700 may correspond to the data flow illustrated in FIG. 2. In FIG. 7, an input design 710 is computed into a smooth surface on a higher dimension into the level set representation 720 (e.g., $\phi_0$). Support structure analysis 730 is performed to identify, based on the level set representation 720, the boundaries that require support structures. A velocity field 740 is constructed based on the identified boundaries. The velocity field 740 is then used to produce an updated level-set function 750. A check logic 760 determines whether the updated level-set function 750 has fully converged (e.g., whether the support structures may be further reduced). If so, the shape modification process 700 exits at 770, resulting in a modified shape as shown in the FIG. 8 (the fourth shape from left to right in the iterations 820). Otherwise, the shape modification process 700 returns to the support structure analysis 730 to further identify overhang boundaries to be modified.

Figure 8:
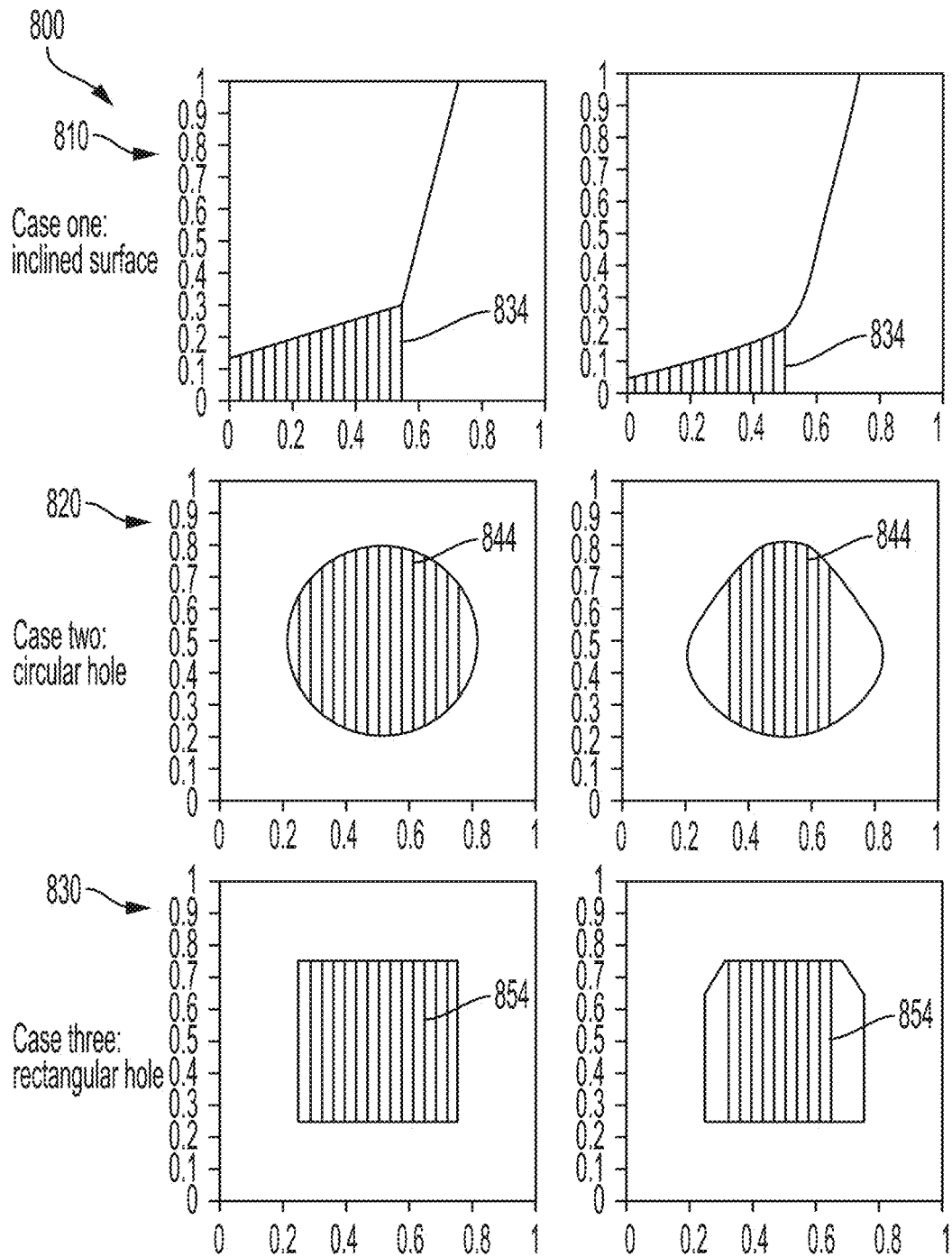
FIG. 8 illustrates examples of cross-sections of iterative steps in the shape modification process of FIG. 7, in accordance with certain aspects of the present disclosure.
Figure 8:
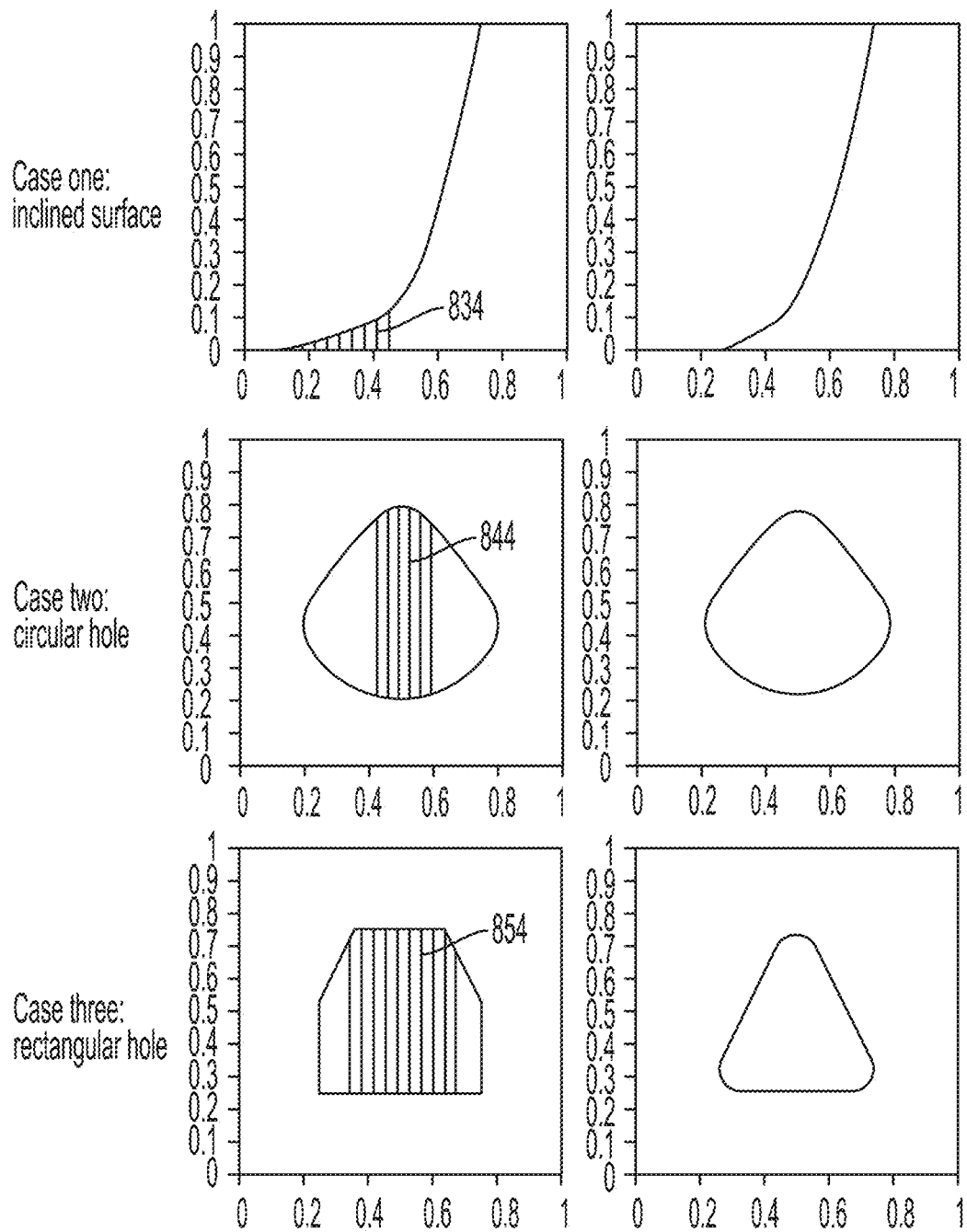

FIG. 8 illustrates examples 800 of cross-sections of iterative steps during the shape modification process 700 of FIG. 7, in accordance with certain aspects of the present disclosure. As shown, intermediate steps of support structures reduction may be visualized and provided to a user. The shape modification examples 810, 820, and 830 respectively correspond to the initial shapes 330, 340, and 350 as shown in FIG. 3B. In the example 810, the inclined surface is iteratively modified (e.g., morphed) into a rounded corner, gradually reducing the need for the support structure 834. The converged result is support free. In the example 820, the circular hole includes an upper half that initially requires the support structure 844. The modified shape changes the upper half shape such that the inclined angle does not exceed the overhang threshold. In the example 830, the rectangular (e.g., square) hole is iteratively modified into a rounded triangular hole, reducing the need for support structures 854 in each iteration. As further shown in FIG. 10, the rounded triangular shape in the example 830 also demonstrates that the disclosed shape modification process may round or smooth out features by controlling smoothing parameters γ and β.

Figure 9:
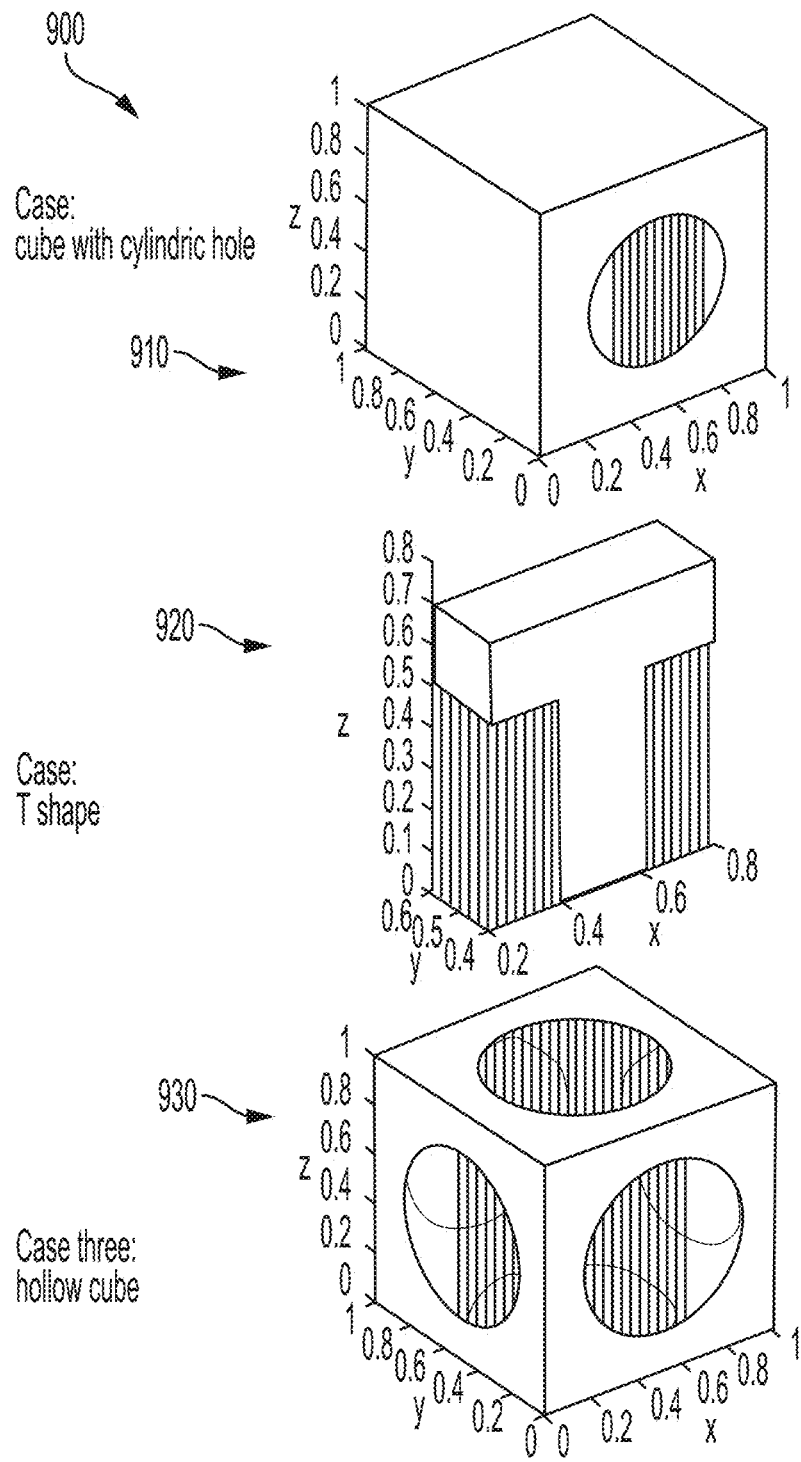
FIG. 9 illustrates examples of 3D shapes of iterative steps in the shape modification process of FIGS. 7 and 8, in accordance with certain aspects of the present disclosure.
Figure 9:
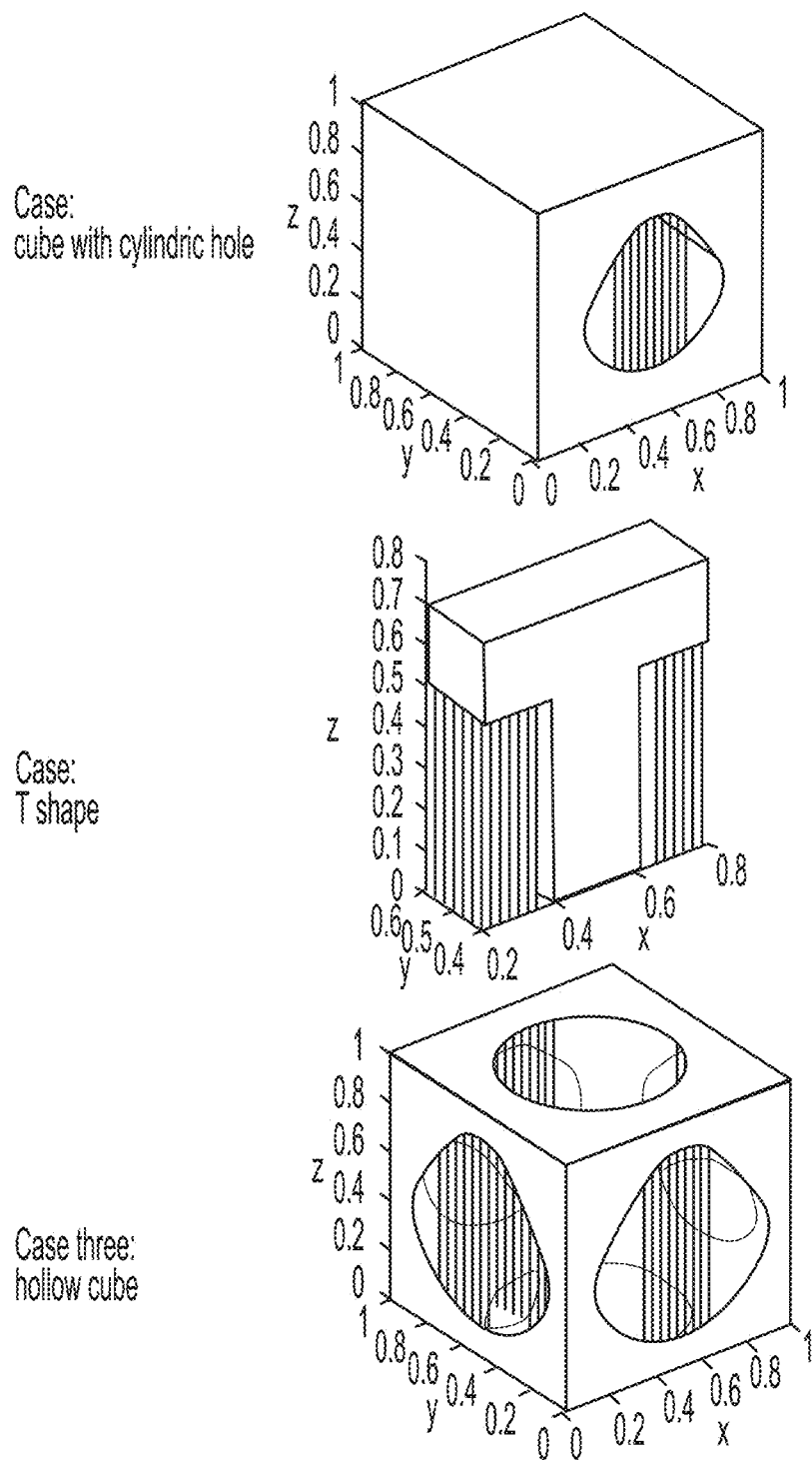
Figure 9:
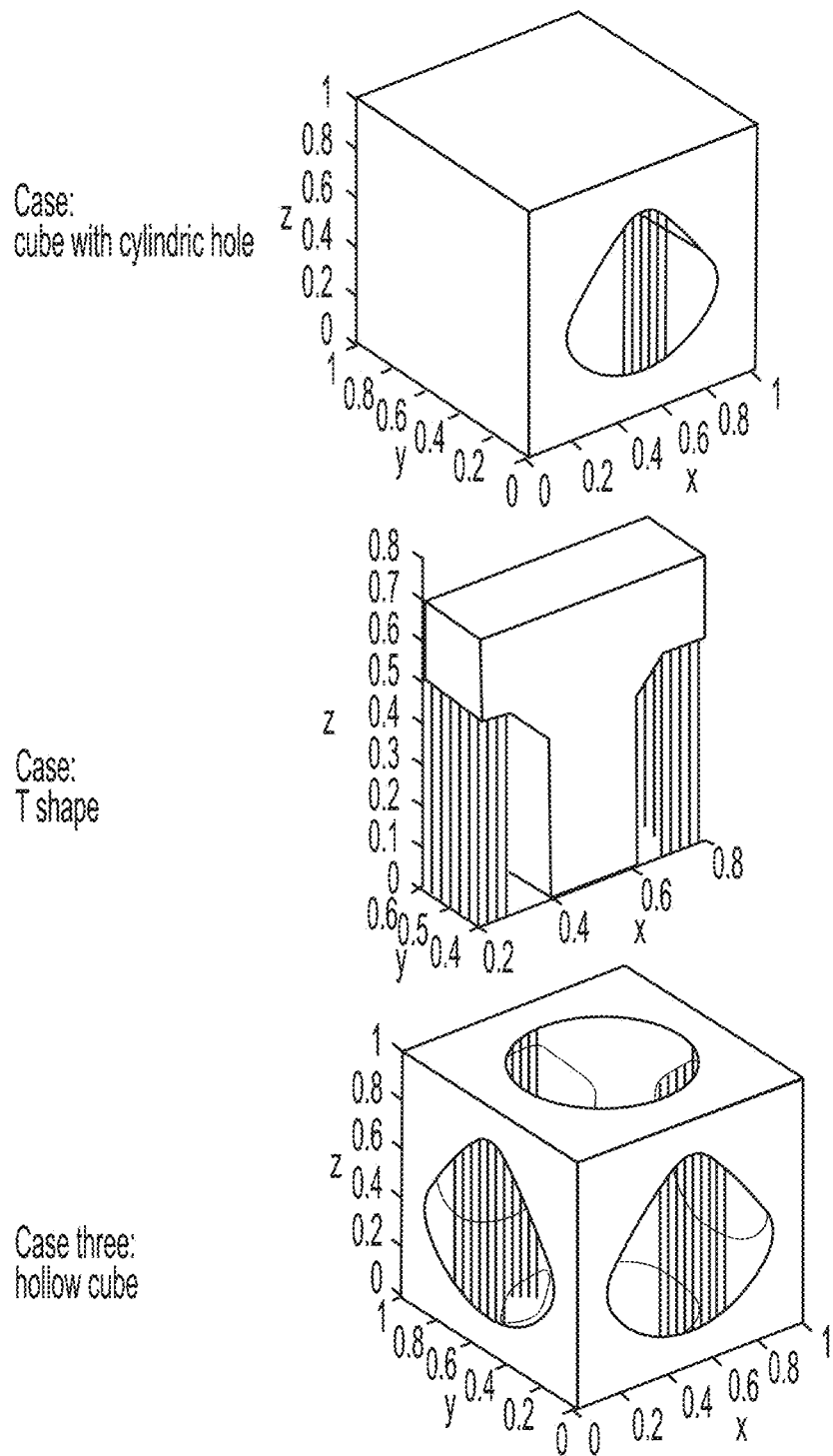
Figure 9:
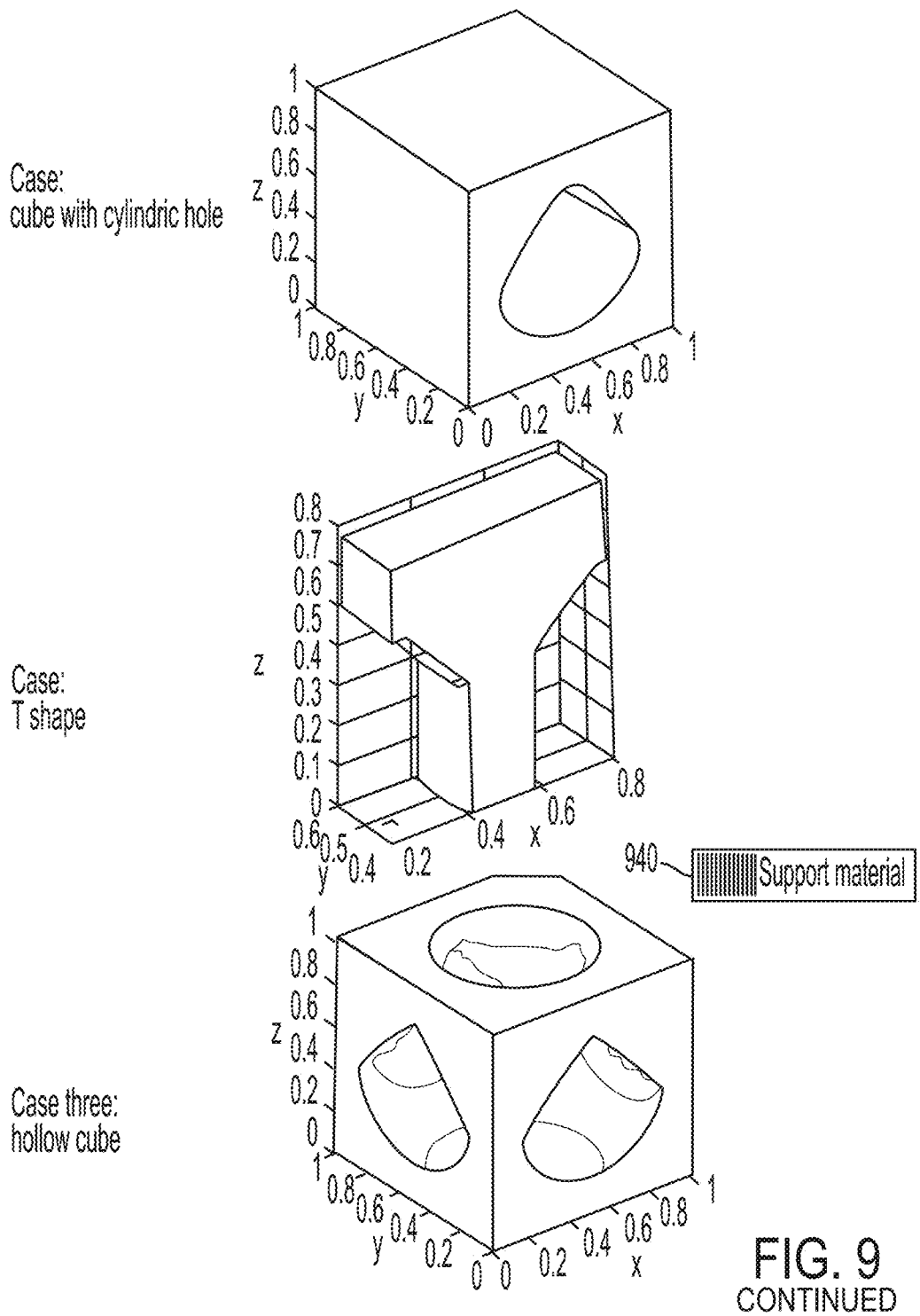

FIG. 9 illustrates examples 900 of 3D shapes of iterative steps in the shape modification process of FIGS. 7 and 8, in accordance with certain aspects of the present disclosure. As shown in the example 910, a cube with a cylindrical hole is modified to reduce the support structures (shown with legend 940) needed for the upper half of the hole. In the example 920, a "T" shaped model is modified to avoid the support structures needed for the arms. In the example 930, the cube is hollowed by a spherical shape and is modified to avoid support structures needed.

Figure 10:
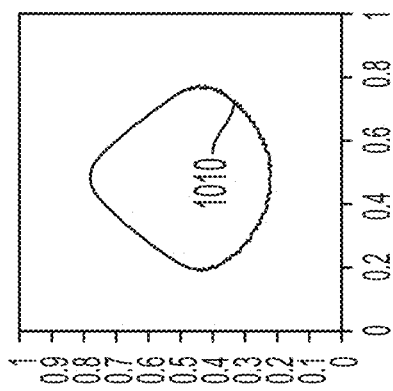
FIG. 10 illustrates examples of smoothing achieved during the shape modification process of FIG. 7 using parameter control, in accordance with certain aspects of the present disclosure.
Figure 10:
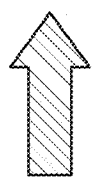
Figure 10:
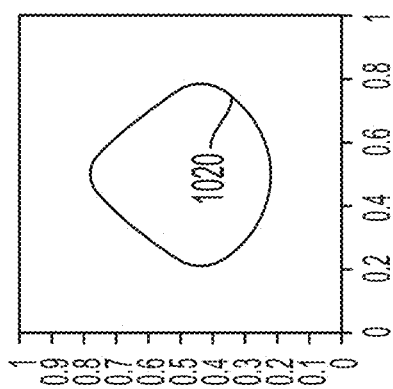
Figure 10:
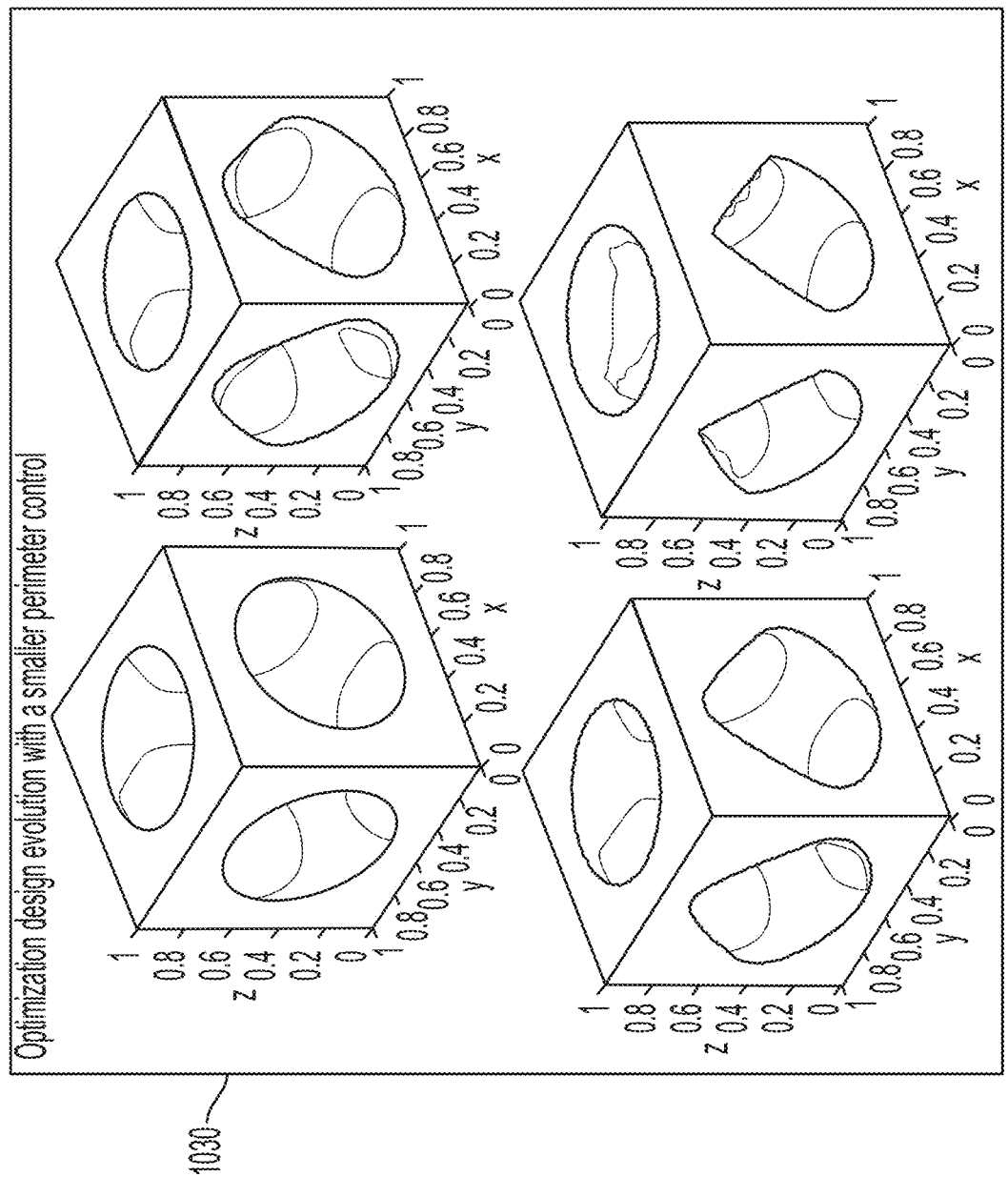
Figure 10:
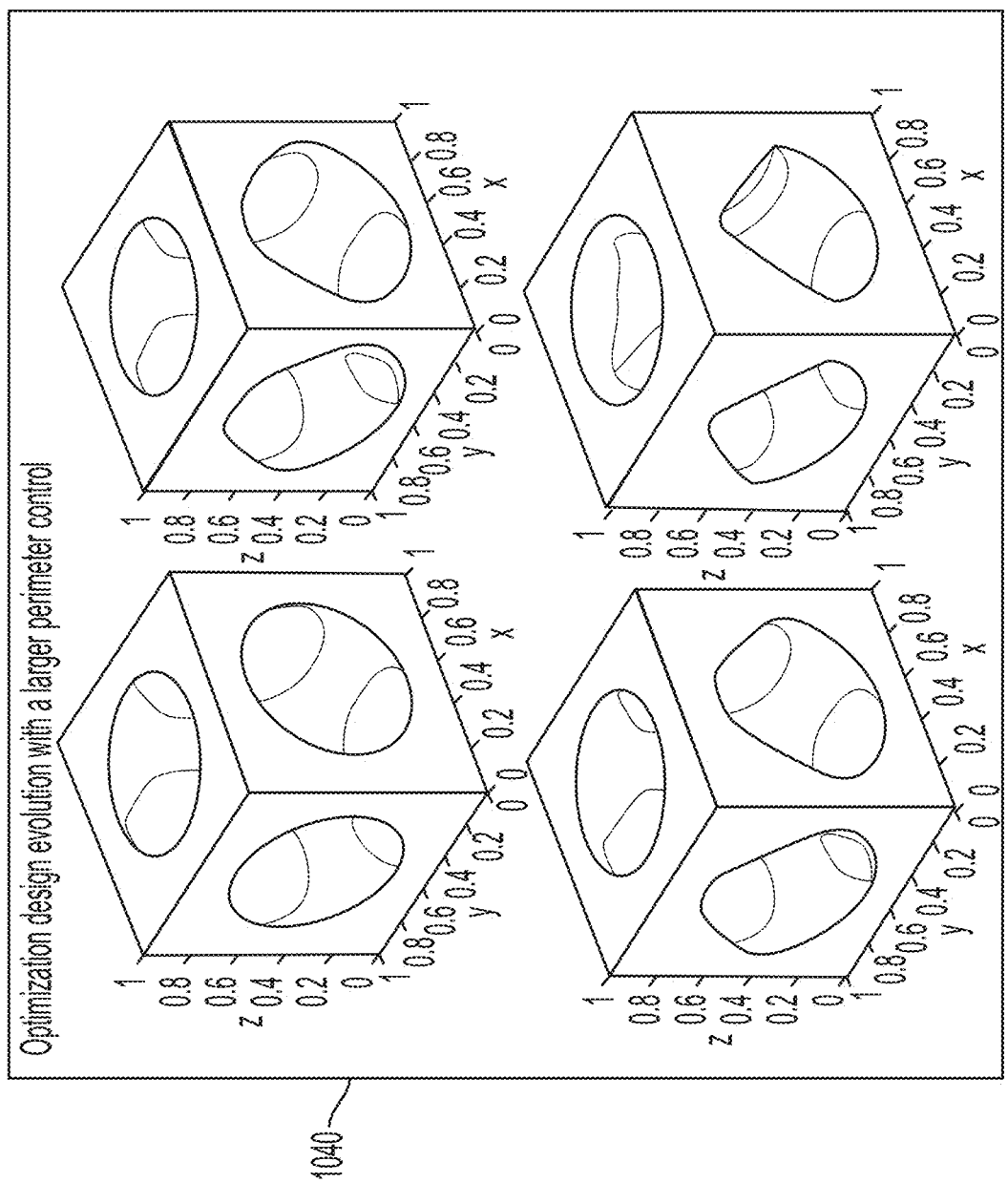

FIG. 10 illustrates examples 1000 of smoothing achieved during the shape modification process of FIG. 7 using parameter control (e.g., γ and β), in accordance with certain aspects of the present disclosure. As shown, irregular features 1010 may be modified into a smooth surface 1020. Similarly, examples 1030 and 1040 demonstrates how the smoothness control term κ may achieve different levels of smoothing during shape modification. In the example 1030, finer corners but rougher surfaces may be produced with a smaller smoothness control, than the corners and surfaces of the example 1040 achieved with a larger smoothness control.

Figure 11:
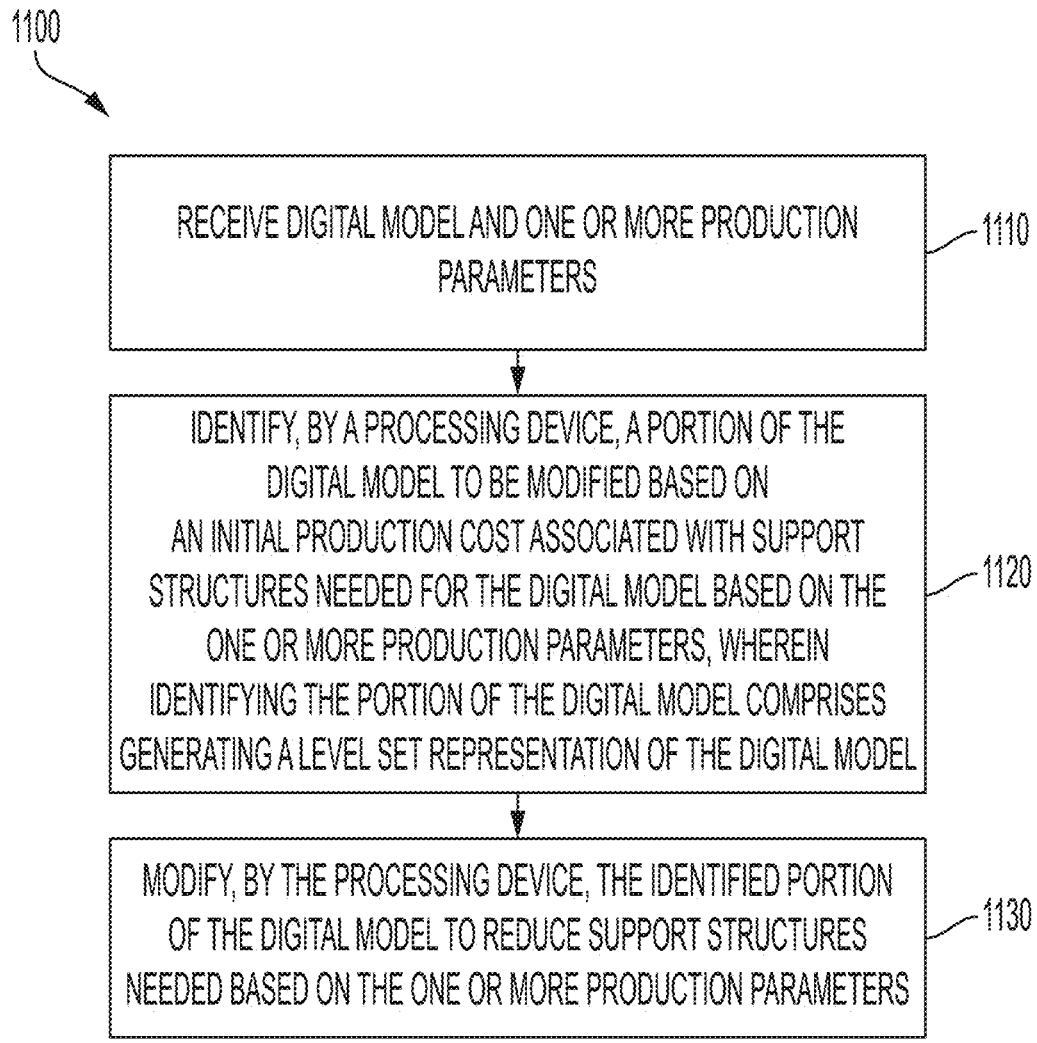
FIG. 11 illustrates a flow diagram of methods of operations, in accordance with certain aspects of the present disclosure.

FIG. 11 illustrates a flow diagram of methods of operations 1100, in accordance with certain aspects of the present disclosure. For example, the operations 1100 may correspond to the processes described with reference to FIG. 7. The operations 1100 may be performed by a processing device, such as the shape modification processing device 160 as described with reference to FIG. 1.

The operations 1100 begins at 1110, by receiving the digital model and one or more production parameters. For example, the digital model may include shape information to be produced in AM, SM, or both. The one or more production parameters may include overhang angle threshold, build direction, and other production parameters or constraints specific to the production techniques used and materials applied.

At 1120, the processing device identifies a portion of the digital model to be modified based on an initial production cost associated with support structures needed for the digital model based on the one or more production parameters, wherein identifying the portion of the digital model comprises generating a level set representation of the digital model.

At 1130, the processing device modifies the identified portion of the digital model to reduce support structures needed based on the one or more production parameters.

In aspects, the one or more production parameters may include at least one of: a production orientation of the digital model, an overhang threshold value, or one or more support generation parameters including at least a value indicating a density or a pattern.

In aspects, the processing device may determine the support structures needed for the digital model based on the one or more production parameters. The processing device may further compute production costs associated with the support structures based on the determination. For example, the processing device may employ an algorithm of providing implicit representation of an initial design by a level set method and evaluating the manufacturing cost by the portion that requires support material.

In some cases, the processing device may construct a function based on the manufacturing cost analysis to guide the design morphing. In some cases, the processing device may provide measurement and visualization of the support volume of the intermediate designs to update the design in the next iteration. In some cases, the processing device may continue to modify the digital model based on one or more iterations of the modified digital model until the improved production cost reaches zero (e.g., support-free or self-supporting).

In aspects, the processing device may identify the portion of the digital model by generating, by the processing device, the level set representation of the digital model using a level set method. The level set representation may include an implicit representation. The processing device may detect overhang boundaries corresponding to the support structures needed and construct a velocity field to alter the overhang boundaries for modifying the identified portion of the digital model. In some cases, the velocity field is constructed based on minimizing an overhang area computed based on a normal direction on an overhang boundary, a direction of production, building, or manufacturing, and an overhang angle threshold indicated in the one or more production parameters. In some cases, the processing device may modify the identified portion of the digital model by iteratively generating intermediate versions of the modified digital model; and outputting measurements and visualizations of volumes of corresponding updated support structures needed for producing the intermediate versions of the modified digital model.

In aspects, the processing device may modify the digital model with an additional portion imposed on the identified portion of the digital model. The additional portion may be removable by subtractive manufacturing techniques (e.g., machining, water or laser cutting, etc.). In some cases, the processing device computes the additional portion of the digital model based on an inaccessible measure field coupled to a velocity field constructed to alter overhang boundaries of the digital model.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 12:
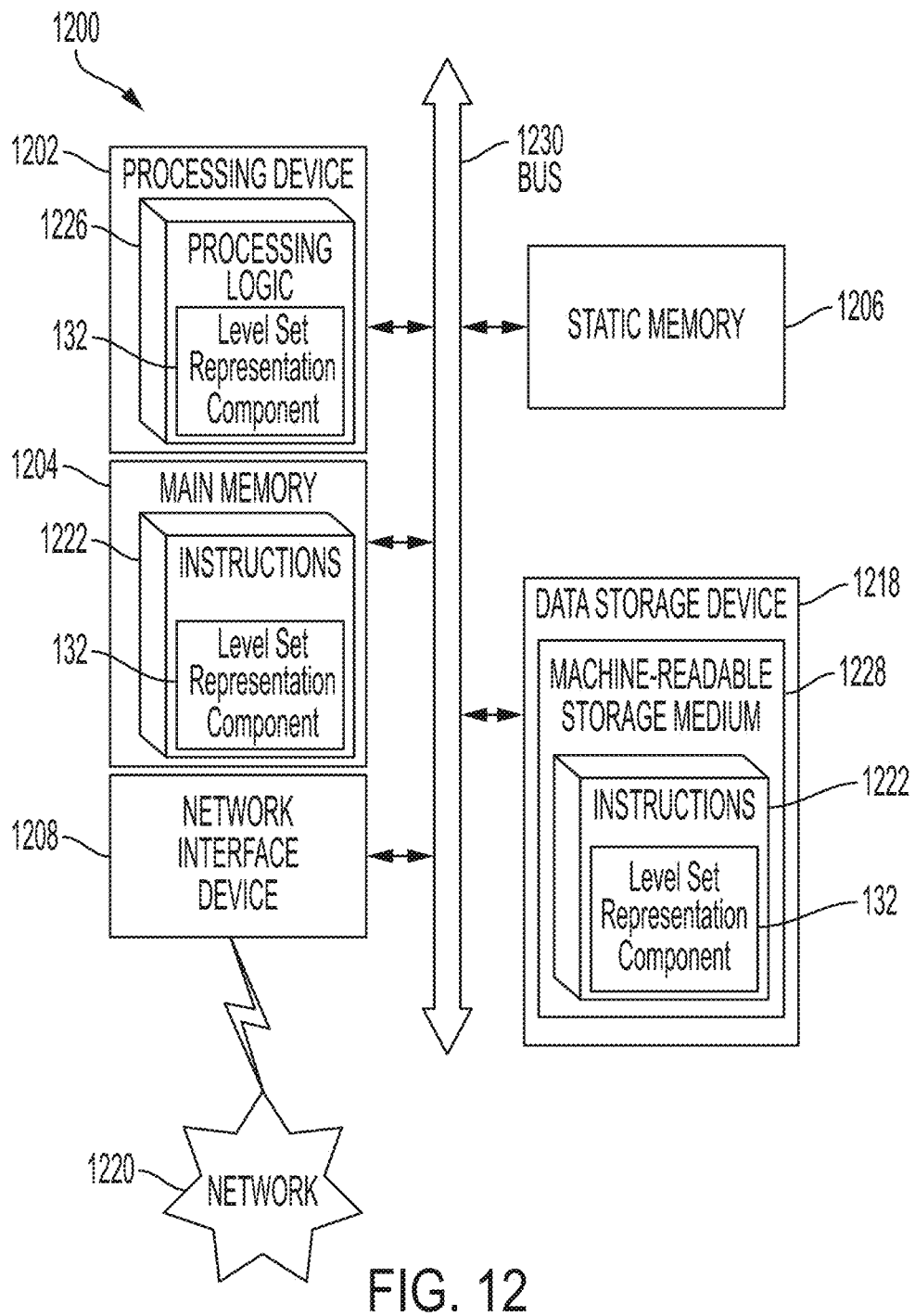
FIG. 12 illustrates an example computational device for performing operations of topology optimization, in accordance with certain aspects of the present disclosure.

FIG. 12 illustrates a diagrammatic representation of a machine in the example form of a computer system 1200 within which a set of instructions 1222, for causing the machine to perform any one or more of the methodologies discussed herein (such as the operations 1100), may be executed. In various embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1200 may be representative of a server computer system, such as system 100.

The exemplary computer system 1200 includes a processing device 1202, a main memory 1204 (e.g., read-only memory (ROM), flash memory, dynamic random access memory (DRAM), a static memory 1206 (e.g., flash memory, static random access memory (SRAM), etc.), and a data storage device 1218, which communicate with each other via a bus 1230. The processing device 1202 may be implemented as the shape modification processing device 160 or a related processing device unit. In some cases, the processing device 1202 may be used to perform tasks associated with the shape modification processing device 160. Any of the signals provided over various buses described herein may be time multiplexed with other signals and provided over one or more common buses. Additionally, the inter 1229 connection between circuit components or blocks may be shown as buses or as single signal lines. Each of the buses may alternatively be one or more single signal lines and each of the single signal lines may alternatively be buses.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may execute processing logic 1226, which may be one example of system 100 shown in FIG. 1, for performing the operations and steps discussed herein.

The data storage device 1218 may include a machine-readable storage medium 1228, on which is stored one or more set of instructions 1222 (e.g., software) embodying any one or more of the methodologies of functions described herein, including instructions to cause the processing device 1202 to execute system 100. The instructions 1222 may also reside, completely or at least partially, within the main memory 1204 or within the processing device 1202 during execution thereof by the computer system 1200; the main memory 1204 and the processing device 1202 also constituting machine-readable storage media. The instructions 1222 may further be transmitted or received over a network 1220 via the network interface device 1208.

The non-transitory machine-readable storage medium 1228 may also be used to store instructions to perform the methods and operations described herein. While the machine-readable storage medium 1228 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method for modifying a shape of a digital model to be used in additive manufacturing, the method comprising:
   receiving the digital model and one or more production parameters;
   identifying, by a processing device, a portion of the digital model to be modified based on an initial production cost associated with support structures including additional materials extending between a foundation to overhangs of the digital model based on the one or more production parameters, wherein the support structures are separate from and to be removed from the digital model, and wherein identifying the portion of the digital model comprises generating a level set representation of the digital model; and
   modifying, by the processing device, the identified portion of the digital model into a modified digital model to reduce the support structures needed based on the one or more production parameters and updated overhangs of the modified digital model, wherein the modified digital model is separate from the support structures.

2. The method of claim 1, wherein the one or more production parameters comprise at least one of: a production orientation of the digital model, an overhang threshold value, or one or more support generation parameters including at least a value indicating a density or a pattern.

3. The method of claim 1, further comprising:
   determining the support structures needed for the digital model based on the one or more production parameters; and
   computing production costs associated with the support structures based on the determination.

4. The method of claim 3, further comprising:
   generating, by the processing device, a set of updated support structures based on the modified digital model;
   computing an improved production cost associated with the set of updated support structures; and
   verifying that the improved production cost is lower than the initial production cost.

5. The method of claim 4, further comprising:
   continuing to modify the digital model based on one or more iterations of the modified digital model until the improved production cost reaches zero.

6. The method of claim 1, wherein identifying the portion of the digital model comprises:
   generating, by the processing device, the level set representation of the digital model using a level set method (LSM), wherein the level set representation is an implicit representation;
   detecting overhang boundaries corresponding to the support structures needed; and
   constructing, by the processing device, a velocity field to alter the overhang boundaries for modifying the identified portion of the digital model.

7. The method of claim 6, wherein the velocity field is constructed based on minimizing an overhang area computed based on:
   a normal direction on an overhang boundary,
   a direction of production, building, or manufacturing, and
   an overhang angle threshold indicated in the one or more production parameters.

8. The method of claim 6, wherein modifying, by the processing device, the identified portion of the digital model comprises:
   iteratively generating intermediate versions of the modified digital model; and
   outputting measurements and visualizations of volumes of corresponding updated support structures needed for producing the intermediate versions of the modified digital model.

9. The method of claim 1, wherein the modification of the digital model comprises an additional portion imposed on the identified portion of the digital model, the additional portion removable by subtractive manufacturing techniques.

10. The method of claim 9, further comprising:
    computing, by the processing device, the additional portion of the digital model based on an inaccessible measure field (IMF) coupled to a velocity field constructed to alter overhang boundaries of the digital model.

11. An apparatus for modifying a shape of a digital model to be used in additive manufacturing, the apparatus comprising:
    a memory;
    a processing device unit operatively coupled to the memory, the processing device unit to:
      receive the digital model and one or more production parameters;
      identify, by a processing device, a portion of the digital model to be modified based on an initial production cost associated with support structures including additional materials extending between a foundation to overhangs of the digital model based on the one or more production parameters, wherein the support structures are separate from and to be removed from the digital model, and wherein identifying the portion of the digital model comprises generating a level set representation of the digital model; and
      modify, by the processing device, the identified portion of the digital model into a modified digital model to reduce the support structures needed based on the one or more production parameters and updated overhangs of the modified digital model, wherein the modified digital model is separate from the support structures.

12. The apparatus of claim 11, wherein the one or more production parameters comprise at least one of: a production orientation of the digital model, an overhang threshold value, or one or more support generation parameters including at least a value indicating a density or a pattern.

13. The apparatus of claim 11, wherein the processing device is further to:
    determine the support structures needed for the digital model based on the one or more production parameters; and
    compute production costs associated with the support structures based on the determination.

14. The apparatus of claim 13, wherein the processing device is further to:
  generate, by the processing device, a set of updated support structures based on the modified digital model;
  compute an improved production cost associated with the set of updated support structures; and
  verify that the improved production cost is lower than the initial production cost.

15. The apparatus of claim 14, wherein the processing device is further to:
  continue to modify the digital model based on one or more iterations of the modified digital model until the improved production cost reaches zero.

16. The apparatus of claim 11, wherein the processing device identifies the portion of the digital model by:
  generating, by the processing device, the level set representation of the digital model using a level set method (LSM), wherein the level set representation is an implicit representation;
  detecting overhang boundaries corresponding to the support structures needed; and
  constructing, by the processing device, a velocity field to alter the overhang boundaries for modifying the identified portion of the digital model.

17. The apparatus of claim 16, wherein the velocity field is constructed based on minimizing an overhang area computed based on:
  a normal direction on an overhang boundary,
  a direction of production, building, or manufacturing, and
  an overhang angle threshold indicated in the one or more production parameters.

18. The apparatus of claim 16, wherein the processing device modifies the identified portion of the digital model by:
  iteratively generating intermediate versions of the modified digital model; and
  outputting measurements and visualizations of volumes of corresponding updated support structures needed for producing the intermediate versions of the modified digital model.

19. The apparatus of claim 11, wherein the processing device modifies the digital model by generating an additional portion imposed on the identified portion of the digital model, the additional portion removable by subtractive manufacturing techniques, and wherein the processing device is further to compute the additional portion of the digital model based on an inaccessible measure field (IMF) coupled to a velocity field constructed to alter overhang boundaries of the digital model.

20. A non-transitory computer-readable storage medium having instructions stored thereon that, when executed by a processing device for modifying a shape of a digital model to be used in additive manufacturing, cause the processing device to:
  receive the digital model and one or more production parameters;
  identify, by a processing device, a portion of the digital model to be modified based on an initial production cost associated with support structures including additional materials extending between a foundation to overhangs of the digital model based on the one or more production parameters, wherein the support structures are separate from and to be removed from the digital model, and wherein identifying the portion of the digital model comprises generating a level set representation of the digital model; and
  modify, by the processing device, the identified portion of the digital model into a modified digital model to reduce the support structures needed based on the one or more production parameters, wherein the modified digital model is separate from the support structures.

* * * * *